United States Patent
Otschik et al.

(10) Patent No.: US 12,007,032 B2
(45) Date of Patent: Jun. 11, 2024

(54) METHOD FOR OPERATING A MECHANICAL FACE SEAL ASSEMBLY, AND MECHANICAL FACE SEAL ASSEMBLY

(71) Applicant: EagleBurgmann Germany GmbH & Co. KG, Wolfratshausen (DE)

(72) Inventors: Joachim Otschik, Murnau (DE); Michael Müller, Bichl (DE); Klaus Lang, Eurasburg (DE); Rolf Johannes, Iffeldorf (DE); Armin Laxander, Ebenhausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 18/025,995

(22) PCT Filed: Aug. 24, 2021

(86) PCT No.: PCT/EP2021/073372
§ 371 (c)(1),
(2) Date: Mar. 13, 2023

(87) PCT Pub. No.: WO2022/058129
PCT Pub. Date: Mar. 24, 2022

(65) Prior Publication Data
US 2023/0366468 A1    Nov. 16, 2023

(30) Foreign Application Priority Data
Sep. 17, 2020  (DE) ...................... 10 2020 124 238.7

(51) Int. Cl.
*F16J 15/34*    (2006.01)
(52) U.S. Cl.
CPC ............ *F16J 15/3492* (2013.01); *F16J 15/34* (2013.01)

(58) Field of Classification Search
CPC ............................... F16J 15/34; F16J 15/3492
See application file for complete search history.

(56) References Cited

U.S. PATENT DOCUMENTS

| | | | | |
|---|---|---|---|---|
| 5,041,989 A | * | 8/1991 | Kataoka | G01H 1/003 73/660 |
| 5,762,342 A | * | 6/1998 | Kakabaker | F16J 15/346 277/306 |

(Continued)

FOREIGN PATENT DOCUMENTS

| EP | 3617824 A1 | 3/2020 |
|---|---|---|
| WO | 2020/006779 A1 | 1/2020 |

OTHER PUBLICATIONS

International Search Report issued in PCT/EP2021/073372 dated Dec. 3, 2021.

*Primary Examiner* — Nicholas L Foster
(74) *Attorney, Agent, or Firm* — Locke Lord LLP; Scott D. Wofsy

(57) ABSTRACT

The invention relates to a method of operating a mechanical seal assembly (1) having a mechanical seal (2) with a rotating sliding ring (3) and a stationary sliding ring (4), defining a sealing gap (5) between the sliding surfaces thereof, comprising the steps of: collecting operating data and/or environmental data of the mechanical seal (2), transmitting the collected operating data and/or environmental data to a digital twin (31) of the mechanical seal (2), simulating and monitoring the operation of the mechanical seal (2) using the digital twin (31) based on the transmitted operating data and/or environmental data of the mechanical seal (2), and retransmitting a simulation result and/or data of the digital twin.

14 Claims, 1 Drawing Sheet

(56) References Cited

U.S. PATENT DOCUMENTS

| | | | |
|---|---|---|---|
| 10,417,614 B2 | 9/2019 | Johnson et al. | |
| 2001/0030396 A1* | 10/2001 | Pecht | F16J 15/3492 |
| | | | 277/317 |
| 2010/0072706 A1* | 3/2010 | Schmitz | F16J 15/43 |
| | | | 277/411 |
| 2017/0241955 A1* | 8/2017 | Meck | G01N 29/326 |
| 2017/0286572 A1* | 10/2017 | Hershey | B64F 5/60 |
| 2018/0328494 A1* | 11/2018 | Rouillon | F16J 15/3444 |
| 2019/0102494 A1* | 4/2019 | Mars | G06F 30/23 |
| 2020/0278325 A1 | 9/2020 | Meck et al. | |

* cited by examiner

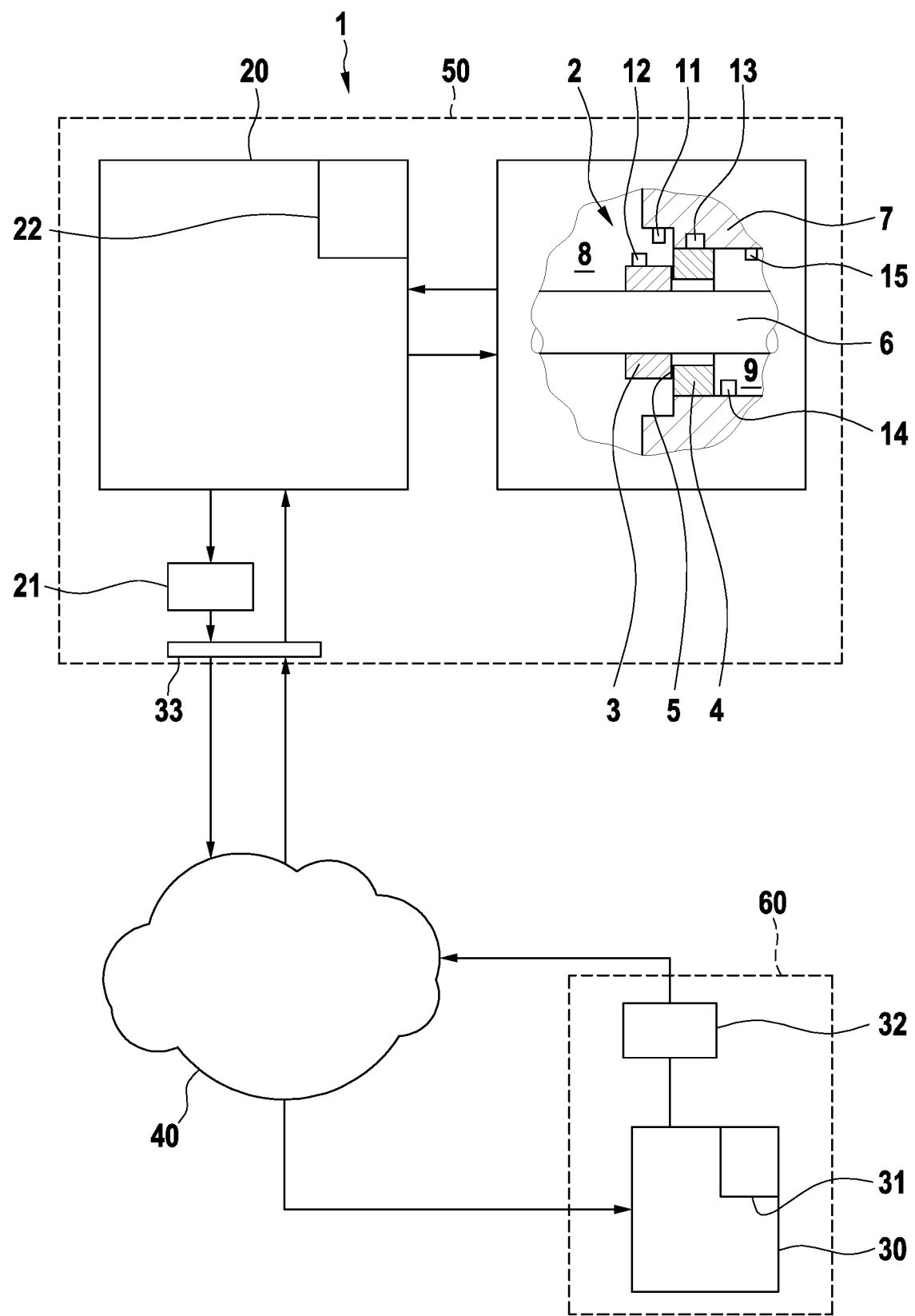

METHOD FOR OPERATING A MECHANICAL FACE SEAL ASSEMBLY, AND MECHANICAL FACE SEAL ASSEMBLY

CROSS-REFERENCE TO RELATED APPLICATIONS

This application is a U.S. National Phase Application filed under 35 U.S.C. § 371, based on International Patent Application No. PCT/EP2021/073372, filed Aug. 24, 2021, which claims priority to German Patent Application No. 10 2020 124 238.7, filed on Sep. 17, 2020, which are incorporated herein by reference.

The present invention relates to a method of operating a mechanical seal assembly using a digital twin that digitally images the mechanical seal, and to a mechanical seal assembly having a digital twin.

Mechanical seal assemblies are known from prior art in various configurations. Mechanical seal assemblies are used to perform essential sealing functions on various machines, wherein in particular critical media are to be sealed. Safe sealing performance is therefore required over a service life of the mechanical seal assembly. In order to be able to predict any possible failure of the mechanical seal assembly as early as possible, it is known to arrange temperature sensors maximally close to the sealing rings of the mechanical seal assembly and to monitor the temperature of the components of the mechanical seal. When reaching critical temperatures, this may indicate that the mechanical seal assembly is likely to develop a technical problem, so that critical medium sealing is no longer assured one hundred percent.

It is therefore an object of the present invention to provide a method for operating a mechanical seal assembly as well as a mechanical seal assembly which, having simple construction and simple, inexpensive manufacturability, enables improved monitoring of the mechanical seal assembly.

This object will be achieved by a method having the features of claim 1 and a mechanical seal assembly having the features of claim 8. The respective subclaims show preferred further embodiments of the invention.

The method according to the invention for operating a mechanical seal assembly having the features of claim 1 has the advantage that control-based operation of the mechanical seal assembly is enabled by using a digital twin of a mechanical seal. Herein, the digital twin forms a digital image of the real mechanical seal to be operated. The digital twin is based on mathematical calculation models and, in particular, on predetermined geometric and physical variables of the mechanical seal and/or collected operating data and/or environmental data of the mechanical seal.

The method comprises the steps of recording a plurality of operating data and/or environmental data of the mechanical seal and transmitting the operating data collected and/or environmental data to the digital twin. For example, the digital twin is mapped on a central computer. Furthermore, operation of the mechanical seal is simulated and monitored using the digital twin, wherein the operating data and/or environmental data of the mechanical seal transmitted to the digital twin will be incorporated. Subsequently, a simulation result and/or data is retransmitted from the central computer of the digital twin to the mechanical seal. When simulating and monitoring operation of the mechanical seal, in particular a comparison of the collected operating data and/or environmental data of the mechanical seal with predetermined target data may be performed by the digital twin. If deviations will be revealed in this process, they will indicate a possible problem in the real mechanical seal, so that countermeasures on the real mechanical seal may be taken by sending back the simulation results and/or data, if required.

In particular, the simulation results obtained may be combined with other additional data newly collected from the real mechanical seal to start a new simulation. In this way, monitoring of the real mechanical seal may continuously performed, either in real time or at predetermined intervals, based on an actual simulation result in combination with new operating data and/or environmental data. This allows quick reaction to changing operating data and/or environmental data of the mechanical seal and executing appropriate countermeasures.

Preferably, when the simulation result is retransmitted to the real mechanical seal, operating commands for the mechanical seal are co-transmitted. This enables remote control of the mechanical seal using the digital twin.

Further preferably, the collected operating data and/or environmental data of the mechanical seal are analyzed in a system computer at the mechanical seal. Direct analysis of the collected operating data at the mechanical seal may enable data reduction so that the energy required for transmission and the data volumes transmitted from the mechanical seal to the digital twin may be reduced. This is particularly advantageous in the case of preferred wireless data transmission between the mechanical seal assembly and the digital twin. As a result, sensible edge computing may be performed using the method according to the invention.

Particularly preferred, the collected operating data and/or environmental data of the mechanical seal are filtered prior of being transmitted to the digital twin. This allows a user of the mechanical seal to optionally not transmit certain data to the digital twin, which digital twin is preferably operated by a manufacturer of the mechanical seal. In this way, information requiring secrecy can remain with the user of the mechanical seal and only the data necessary for the controller of the mechanical seal is transmitted to the digital twin, which is outside the user's area of use. Further preferably, the simulation results and/or data of the digital twin are also filtered prior to being transmitted from the digital twin to the real mechanical seal. This enables the digital twin operator to filter which information is retransmitted to the real mechanical seal assembly. Furthermore, the filtering may also result in data reduction. In particular, only simulation results and commands relevant to operate the mechanical seal are transmitted from the digital twin to the real mechanical seal.

According to another preferred embodiment of the invention, a trend analysis of the collected operating data is performed when processing the collected operating data in the digital twin. This allows extrapolation of further operating data history and, in particular, to be used in the controller of the real mechanical seal.

Further preferably, clusters are formed when processing the collected operating data in the digital twin to combine several individual data sets during a cluster analysis. In this way, sensible data reduction may be realized.

According to another preferred embodiment of the invention, data reduction will be performed prior to the step of transmitting data, thus reducing both the data which are transmitted to the digital twin, and the data which are retransmitted from the digital twin. In particular, this may allow simple and faster data processing as well as communication acceleration.

Preferably, the collected operating data of the real mechanical seal are selected among data of temperature, pressure, rotational speed, leakage through the mechanical seal, gap height of the mechanical seal, vibrations at the sliding rings of the mechanical seal, structure-borne sound, surface sound, stresses and/or deformations of the sliding rings, occurrence of a contact of the sliding surfaces of the sliding rings and/or wear at the sliding rings of the mechanical seal.

Further preferably, the system computer at the mechanical seal comprises a configurable second digital twin. Preferably, the configurable second digital twin has reduced functions compared to the first digital twin. This allows an adapted second digital twin to be available to the user of the mechanical seal assembly which, for example, is used to perform limited simulations and/or monitoring of the mechanical seal assembly. Herein, the configurable second digital twin is configured to receive data and/or updates from the first digital twin.

In a particularly preferred embodiment, the first digital twin and/or the second digital twin are designed as a learning system, so that experience gained during operation of the mechanical seal assembly results in continuous adaptation and updating of the first digital twin.

Furthermore, the present invention relates to a mechanical seal assembly comprising a mechanical seal having a rotating and a stationary sliding ring, defining a sealing gap between the sliding surfaces thereof. In this regard, the mechanical seal assembly comprises a plurality of sensors for sensing various operating data and/or environmental data of the mechanical seal assembly. Furthermore, the mechanical seal assembly comprises a central computer with a digital twin of the real mechanical seal, wherein the central computer is configured to simulate an operation of the real mechanical seal on the digital twin based on the operating data collected and/or environmental data and pre-existing data of the mechanical seal. For example, the already existing data of the mechanical seal may be physical data or geometric dimensions of the mechanical seal and other data, for example of the medium to be sealed, in particular an average temperature of the medium to be sealed and/or an average pressure to be sealed or further environmental data of the mechanical seal, as well as also data obtained from a previous simulation process. Furthermore, the mechanical seal assembly comprises a transceiver device configured to transmit the collected operating data and/or environmental data to the central computer with the digital twin and to receive the generated simulation results and/or data of the digital twin. It should be noted that herein, a separate transceiver device may be provided or, alternatively, a transceiver device present on the machine to be sealed may also be used.

Further preferably, the mechanical seal further comprises a system computer at the mechanical seal, which is operated at the user of the mechanical seal and is configured to process the collected operating data and/or environmental data. As a result, processing of the collected operating data may take place directly at or near the mechanical seal and thus, preferably, data reduction can take place directly at the system computer. This may significantly reduce the effort required to transmit the operating data and/or environmental data.

The system computer is further preferably configured to filter the collected operating data and/or environmental data. This allows a user of the mechanical seal to easily determine, for example, which data should be released to the digital twin for data analysis and which data should remain secret.

Most preferably, the central computer having the digital twin is configured to perform a trend analysis with the collected operating data and/or environmental data of the real mechanical seal, in particular to enable future prediction of operational parameters by exploration. Further preferably, the central computer is configured to perform a clustering of operating data and/or environmental data and/or simulation data to accelerate the simulation and/or to reduce the simulation results to be retransmitted with respect to their data volume. Preferably, data reduction is performed prior to the respective data transmission.

Further preferably, the mechanical seal assembly comprises a cloud computer which is interposed between the central computer and the system computer. It should be noted herein that the digital twin and computational operations may also be performed in the cloud computer, so that, for example, collected operating data already revised will be fed to the digital twin only and simulation will be performed using this revised operating data.

Further preferably, the system computer comprises a configurable, second digital twin, the configurable second digital twin having the same or smaller range of functions than the first digital twin on the central computer. As a result, the configurable second digital twin can, for example, produce necessary simulation results more quickly, e.g., in case of emergency. Furthermore, a user of the mechanical seal assembly may also configure the second digital twin himself and, for example, simulate and/or monitor parameters that are important to him. Further preferably, the first digital twin in the central computer already uses monitoring and/or simulation results of the configurable second digital twin, so that data processing in the first digital twin can be accelerated.

Further preferably, the first digital twin and/or the configurable second digital twin, is each configured as a learning system. This enables the digital twins to be adapted over time.

Hereinafter, an example embodiment of the invention will be described in detail while reference is made to the accompanying drawing, wherein:

FIG. 1 is a schematic representation of a mechanical seal assembly according to a preferred example embodiment of the invention.

As may be seen from FIG. 1, the mechanical seal assembly 1 comprises a mechanical seal 2, which is arranged at a user 50 of the mechanical seal, and a central computer 30, which is arranged at a manufacturer of the mechanical seal, for example.

The mechanical seal 2 comprises a rotating sliding ring 3 and a stationary sliding ring 4, defining a sealing gap 5 between the sliding surfaces thereof. The mechanical seal 2 seals between a product region 8 and an atmosphere region 9 at a shaft 6 and a housing 7.

The mechanical seal 2 further comprises a plurality of sensors. In this example embodiment, a first sensor 11 is provided as a rotational speed sensor for determining a rotational speed of the mechanical seal. A second sensor 12 is a combined temperature-pressure sensor, which detects pressure and/or temperature near the mechanical seal. A third sensor 13 is a vibration sensor. A fourth sensor 14 is a combination of a structure-borne sound sensor and a surface sound sensor. A fifth sensor 15 is a leakage sensor.

The mechanical seal 2 further comprises a system computer 20, which is arranged near the mechanical seal in the area of the user.

The central computer 30 comprises a digital twin 31, which is a complete digital image of the real mechanical seal 2. The digital twin 31 is based on basic data of the mechanical seal 2, for example geometrical and physical data, e.g. dimensions of the mechanical seal, materials used, environmental data, as well as basic operating data, for example temperature, pressure and speed at which the mechanical seal 2 is to be operated.

The sensors 11 to 15 each capture the data at the real mechanical seal 2 and transmit them to the system computer 20, preferably wirelessly. The system computer 20 is configured to reduce the amount of data to enable most simple and efficient data transmission from the system computer 20 to the central computer 30 by using a transmitter-receiver device 33. As can be seen from FIG. 1, prior to the actual data transmission, a first filter 21 is still provided at the user 50, used by the user 50 to determine which type of data is transmitted to the central computer 30.

As may further be seen from FIG. 1, in this example embodiment, the data are not transmitted directly to the central computer 30, but are transmitted to the central computer 30 via a cloud computer 40. The operating data collected and transmitted are used in the digital twin 31 in the central computer 30 to perform simulation and monitoring of the real mechanical seal 2. In this process, a simulation of the real mechanical seal 2 is continuously performed, preferably in real time, and respective simulation results are output. The simulation results will then be retransmitted to the system computer 20 of the mechanical seal 2. Herein, the manufacturer 60 can filter the simulation results and/or further transmitted data and/or commands using a second filter 32. Transmission from the central computer 30 of the manufacturer 60 to the system computer 20 is again carried out via the cloud computer 40, as shown in FIG. 1.

In the simulation, previous simulation results are continuously reused and likewise continuously newly collected operating data of the real mechanical seal 2 will be incorporated into the simulation, so that real-time monitoring of the real mechanical seal 2 by the digital twin 31 is possible. During retransmission of the simulation results and/or data of the digital twin, operating commands for the mechanical seal 2 can also be transmitted, for example, to be able to take appropriate countermeasures on the real mechanical seal 2 if a problem is detected.

In the process according to the invention of manufacturing the mechanical seal assembly 1, current operating data of the real mechanical seal 2 are thus collected and transmitted to the digital twin 31. In the digital twin 31, simulation and monitoring of the operation of the mechanical seal 2 is performed and simulation results and/or commands are sent back to the real mechanical seal 2.

It should be noted that transmission of data and simulation results and/or commands can also be performed directly from the system computer 20 to the central computer 30 and vice versa without interposition of the cloud computer 40. Furthermore, it should be noted that data reduction may also be performed, for example, in the cloud computer 40 and/or the digital twin 31 may also be run in the cloud computer 40. Then, the manufacturer 60 could access the digital twin in the cloud computer 40 from his central computer 30. It should further be noted that other IT architectures are also conceivable. It is also possible that the user 50 will have access to the digital twin, for example, if the digital twin is running in the cloud computer 40.

Furthermore, it is also possible that a configurable second digital twin 22 is run in the system computer 20. This second digital twin 22 preferably has a smaller range of functions than the first digital twin 31, but may also theoretically have all the functions of the first digital twin 31. However, it is preferred that the configurable second digital twin 22 has a smaller range of functions. In this context, the second digital twin 22 can precisely be adapted to the respective user 50 and, for example, provide data and/or simulation results which have the greatest information value to the user 50. It is also possible for the configurable second digital twin 22 to perform pre-processing of the collected data so that simulation in the first digital twin 31 can be accelerated. Further preferably, both the first digital twin 31 and the second digital twin 22 are each configured as learning systems. Furthermore, it is also possible to perform data buffering and to perform transmission at predetermined intervals, for example, every minute or every hour or every day. In addition to the advantage of preserving data in the event of data loss, this buffering process has the additional advantage that a computing capacity may remain within a predetermined range.

Furthermore, the central computer 30 can also perform a trend analysis of the operating data collected of the real mechanical seal 2 and thereby extrapolate whether countermeasures should be taken, if necessary, to protect the mechanical seal 2, for example in the event of continuous pressure and/or temperature increases. Furthermore, it is also possible that clustering of the collected operating data is performed for data reduction so as to enable fast and smooth data transmission between the real mechanical seal 2 and the digital twin 31.

The method according to the invention and the mechanical seal assembly 1 according to the invention may in particular be used to determine maintenance times of the mechanical seal 2. This may ensure that occurrence of possibly very expensive mechanical seal failure may be avoided, but that instead maintenance will be performed before occurrence of damage to the mechanical seal. Moreover, by combining the simulation and the trend analysis, it is possible to determine relatively accurately when failure of mechanical seal 2 components is to be expected and to schedule a maintenance date accordingly beforehand.

LIST OF REFERENCE NUMBERS

1 Mechanical seal assembly
2 Mechanical seal
3 Rotating sliding ring
4 Stationary sliding ring
5 Sealing gap
6 Shaft
7 Housing
8 Product region
9 Atmosphere region
11 First sensor/speed sensor
12 Second sensor/temperature and pressure sensor
13 Third sensor/Vibration sensor
14 Fourth sensor/structure-borne sound sensor
15 Fifth sensor/leakage sensor
20 System computer
21 First filter
22 Second digital twin
30 Central computer
31 Digital twin
32 Second filter
33 Transmitter-receiver device
40 Cloud computer
50 User/customer
60 Manufacturer

The invention claimed is:

1. A method of operating a mechanical seal assembly having a mechanical seal with a rotating sliding ring and a stationary sliding ring defining a sealing gap between the sliding surfaces thereof, comprising the steps of:
    collecting operating data and/or environmental data of the mechanical seal,
    transmitting the collected operating data and/or environmental data to a digital twin of the mechanical seal,
    simulating and monitoring the operation of the mechanical seal using the digital twin based on the transmitted operating data and/or environmental data of the mechanical seal, and
    retransmitting a simulation result and/or data of the digital twin.

2. The method according to claim 1, wherein the simulating and monitoring the mechanical seal is continuously performed based on currently collected operating data and/or environmental data of the mechanical seal as well as preceding simulation results.

3. The method according to claim 1, wherein during the step of retransmitting the simulation result and/or the data, operating commands for the mechanical seal are additionally co-transmitted.

4. The method according to claim 1, wherein the operating data and/or environmental data collected from the mechanical seal are analyzed using a system computer at the mechanical seal and the analyzed data are transmitted to the digital twin.

5. The method according to claim 1,
    wherein the collected operating data and/or environmental data of the mechanical seal are filtered using a first filter prior to being transmitted to the digital twin and/or
    wherein the simulation results and/or data of the digital twin are filtered using a second filter prior to being transmitted to the mechanical seal and/or
    wherein a reduction of the data is performed prior to the step of transmitting.

6. The method according to claim 1,
    wherein when processing the collected operating data and/or environmental data in the digital twin a trend analysis is performed using the collected operating data, and/or
    wherein when processing the operating data and/or environmental data in the digital twin, clustering of the collected operating data is performed, and/or
    wherein the digital twin is a learning system.

7. The method according to one claim 1, wherein the collected operating data of the mechanical seal are selected among data on temperature, pressure, rotational speed, leakage, gap height at the seal gap, vibrations at the mechanical seal, structure-borne sound, surface sound, stresses and/or deformations of the sliding rings, occurrence of contact of the sliding surfaces of the sliding rings and/or wear at the mechanical seal.

8. A mechanical seal assembly comprising:
    a mechanical seal having a rotating sliding ring and a stationary sliding ring, defining a sealing gap between the sliding surfaces thereof, and having a plurality of sensors, the sensors being configured to detect various operating data and/or environmental data of the mechanical seal,
    a central computer comprising a digital twin of the mechanical seal, the central computer being configured to simulate and monitor an operation of the mechanical seal using the digital twin, and
    a transmitter-receiver device configured to transmit the detected operation data and/or environment data of the mechanical seal to the central computer and to receive simulation results of the digital twin.

9. The mechanical seal assembly according to claim 8, wherein the mechanical seal assembly furthermore comprises a system computer which is configured to process and/or reduce the collected operating data and/or environmental data of the mechanical seal assembly.

10. The mechanical seal assembly according to claim 9, wherein the system computer is configured to filter the collected operating data and/or environmental data of the mechanical seal using a first filter.

11. The mechanical seal assembly according claim 8, wherein the central computer is configured to perform a trend analysis and/or a clustering of the collected operating data and/or environmental data of the mechanical seal using the collected operating data and/or environmental data.

12. The mechanical seal assembly according to claim 9, wherein a cloud computer is interposed between the central computer and the system computer.

13. The mechanical seal assembly according to claim 9, wherein the system computer comprises a configurable second digital twin.

14. The mechanical seal assembly according to claim 8, wherein the digital twin and/or the second digital twin is configured as a learning system.

* * * * *